United States Patent
Lee

(10) Patent No.: US 6,671,784 B2
(45) Date of Patent: Dec. 30, 2003

(54) SYSTEM AND METHOD FOR ARBITRATING ACCESS TO A MEMORY

(75) Inventor: Jin Hyuk Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 83 days.

(21) Appl. No.: 09/996,934

(22) Filed: Nov. 30, 2001

(65) Prior Publication Data

US 2002/0078313 A1 Jun. 20, 2002

(30) Foreign Application Priority Data

Nov. 30, 2000 (KR) ..................... P2000-71956

(51) Int. Cl.[7] .............................................. G06F 12/00
(52) U.S. Cl. ..................... 711/151; 711/158; 711/163; 711/167; 710/6; 710/28; 710/40; 710/309; 710/244
(58) Field of Search ............................. 710/6, 16, 17, 710/19, 28, 40, 41, 44, 309, 220, 240, 244; 711/151, 158, 163, 167, 169

(56) References Cited

U.S. PATENT DOCUMENTS

| | | | | |
|---|---|---|---|---|
| 4,558,412 A | * | 12/1985 | Inoshita et al. | 710/28 |
| 4,809,169 A | * | 2/1989 | Sfarti et al. | 712/20 |
| 5,077,733 A | * | 12/1991 | Whipple | 370/438 |
| 5,301,283 A | * | 4/1994 | Thacker et al. | 710/116 |
| 5,506,970 A | * | 4/1996 | Wozniak | 710/113 |
| 5,613,136 A | * | 3/1997 | Casavant et al. | 712/28 |
| 6,212,589 B1 | * | 4/2001 | Hayek et al. | 710/119 |
| 6,505,265 B1 | * | 1/2003 | Ishikawa et al. | 710/113 |

* cited by examiner

Primary Examiner—Donald Sparks
Assistant Examiner—Christian P. Chace
(74) Attorney, Agent, or Firm—Birch, Stewart, Kolasch & Birch, LLP

(57) ABSTRACT

A method and a system for arbitrating accesses to a memory in a data processing system having many memory access units (MAU) and an arbiter are disclosed. The arbiter initially sends a permission signal to each MAU to give each MAU a chance to reset its priority level if necessary. Then each of a first set of top priority MAUs that was not able to access to the memory for a predetermined period of time resets its priority level to a top priority value and sends a second priority value to the arbiter. Thereafter the arbiter selects a MAU among the first set of top priority MAUs and sends an acknowledgement signal to the selected MAU. If none of the first set of top priority MAUs exist, the arbiter identifies a second set of top priority MAUs by checking the predetermined starvation period of each MAU and sends an acknowledgement signal to one of the second set of top priority MAUs.

28 Claims, 6 Drawing Sheets

SYSTEM AND METHOD FOR ARBITRATING ACCESS TO A MEMORY

This application claims the benefit of the Korean Application No. P2000-71956 filed on Nov. 30, 2000, which is hereby incorporated by reference.

BACKGROUND OF THE INVENTION

1. Field of the Invention

The present invention relates to a data processing system having a plurality of Memory Access Units (MAU), and more particularly, to a system and a method for arbitrating access to a shared memory in a data processing system.

2. Discussion of the Related Art

In general, a data processing system (i.e., a digital video processor), which has a plurality of Memory Access Units (MAU), has an arbiter that allows a MAU to access to a memory data bus each time. FIG. 1 illustrates a typical digital video processor showing interfaces between an arbiter and each MAU. As shown in the figure, the system includes a plurality of MAUs 102–106, an arbiter 101, and a memory 100.

Each MAU initially activates a requesting signal and outputs its priority level set to an initial priority value to the arbiter 101. Then the arbiter 101 performs the arbitration process that allows a selected MAU to access to the memory 100 by sending an acknowledgement signal to the MAU.

The MAUs shown in FIG. 1 are a transport decoder 102, a video decoder 103, a format converter 104, and a host interface 106.

First, the transport decoder 102 initially selects a desired program among many programs included in a channel and separates audio and video bit streams from the data. Thereafter, the separated video and audio bit streams are outputted to the video decoder 103 and the audio decoder 105, respectively, after passing through the arbiter 101 and the memory data bus.

The video decoder 103 eliminates the overhead portion (i.e., header information and starting code) of the video bit streams received and carries out processes including Variable Length Decoding (VLD), inverse quantization, Inverse Discrete Cosine Decoding (IDCT), and motion compensation using motion vectors. Then the data processed in the video decoder 103 get stored in the memory 100 after passing through the arbiter 101 and the memory data bus.

The format converter 104 reads the data stored in the memory 100 and converts their display format. Then the format-converted data are stored again in the memory via the arbiter 101 and the memory data bus.

The audio decoder 105 compensates the audio bit streams, which are inputted using an MPEG or Audio Coding-3 (AC-3) algorithm, and stores the compensated data in the memory 100.

The arbiter 101 controls the data inputs/outputs to the memory 100 and the memory data bus. In other words, it controls the data flows between the memory 100 and each MAU. If the arbiter 101 selects the video decoder 103 as a result of its arbitration process, the arbiter 101 sends an acknowledgement signal to the video decoder 103 so that it can access to the memory 100.

When selecting an arbitration algorithm for an arbiter, the fairness and efficiency factors must be considered based on the characteristics and structure of the data processing system. An example of the algorithm, to which the fairness factor is applied, is the algorithm having the Round Robin structure. Using the Round Robin structure, all the MAUs can access to the memory in a predetermined order regardless of their priority values. Once a MAU accesses to the memory, it has to wait until all other MAUs participating in the arbitration access to the memory in order to re-access to the memory. Therefore, the arbitration algorithm having the Round Robin structure gives an equitable chance to each of the MAUs that have requested for accessing to the memory.

However, this type of algorithm is not suitable for a digital video processor, in which the MAUs having higher priority values need to access to memory more frequently than others with limited time. Therefore, an arbitration algorithm implementing a priority structure is often used.

The algorithm having the priority structure still has few disadvantages. The MAUs having relatively lower priority values may not be able to access to the memory for a long time while other MAUs use the memory data bus exclusively. This is called as starvation. The occurrence of such starvation may result an abnormal behavior of the system.

SUMMARY OF THE INVENTION

Accordingly, the present invention is directed to a method and system for arbitrating access to a shared memory in a data processing system having a plurality of data access units that substantially obviates one or more problems due to limitations and disadvantages of the related art.

An object of the present invention is to provide a method and system for arbitrating access to a memory in a data processing system having an arbiter that efficiently allows each memory access unit to access to the memory.

Another object of the present invention is to provide a method and system for arbitrating access to a memory in a data processing system including memory access units, each unit being able to reset its priority level to a top priority value if necessary.

Another object of the present invention is to provide a method and system for arbitrating access to a memory in a data processing system having an arbiter being able to give a top priority to each MAU that have failed to access to the memory for a predetermined starvation period.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a memory accessing method for a memory access unit (MAU) in a data processing system having a memory includes the steps of (a) sending an access requesting signal and a first priority signal to an arbiter, said first priority signal indicating a priority level initially set to an initial priority value; (b) resetting said priority level to a top priority value and sending a second priority signal indicating said reset priority level to said arbiter; and (c) receiving an acknowledgement signal from said arbiter and accessing to said memory.

In another aspect of the present invention, a memory accessing method for a MAU in a data processing system having a memory includes the steps of (a) sending an access requesting signal and a first priority signal to an arbiter, said first priority signal indicating a priority level initially set to an initial priority value; and (b) determining whether to reset said priority level to a top priority value.

The method further includes (c) resetting said priority level to said top priority value and sending a second priority signal indicating said reset priority level to said arbiter if it is determined to reset said initially set priority level in the step (b); and (d) receiving an acknowledgement signal from said arbiter and accessing to said memory.

In another aspect of the present invention, a method of arbitrating access to a memory for an arbiter in a data processing system having MAUs includes the steps of (a) receiving an access requesting signal and a first priority signal from each of an original set of MAUs, said first priority signal indicating a priority level initially set to an initial priority value for each MAU; and (b) identifying a first set of top priority MAUs whose priority levels are set to a top priority value.

The method further includes the steps of (c) selecting a first final MAU among said first set of top priority MAUs; and (d) sending an acknowledgement signal to said first final MAU.

The method further includes the steps of (e) identifying a second set of top priority MAUs if none of said first set of top priority MAUs are identified in the step (b), each of said second set of top priority MAUs being unable to access to said memory for a predetermined starvation period; (f) selecting a second final MAU among said second set of top priority MAUs; and (g) sending said acknowledgement signal to said second final MAU.

In addition, the method further includes the steps of (h) selecting a third final MAU among said original set of MAUs if none of said second set of top priority MAUs are identified in the step (e); and (i) sending said acknowledgement signal to said third final MAU.

In another aspect of the present invention, a system for accessing to a memory in a data processing system includes a plurality of memory access units (MAU), each MAU initially sending an access requesting signal and a first priority signal that indicates a priority level set to an initial priority value, each MAU resetting said initially set priority level to a top priority value if necessary and sending a second priority signal indicating said reset priority level; and an arbiter identifying a first set of top priority MAUs whose priority levels are reset to said top priority value, said arbiter subsequently selecting a first final MAU among said first set of top priority MAUs and sending an acknowledgement signal to said first final MAU.

The arbiter included in the system further identifies a second set of top priority MAUs being unable to access to said memory for a predetermined starvation period if none of said first set of top priority MAUs are identified, said arbiter selecting a second final MAU among said second set of top priority MAUs and sending said acknowledgement signal to said second final MAU.

In addition, the arbiter further selects a third final MAU among said plurality of MAUs if non of said second set of top priority MAUs are identified and sends said acknowledgement signal to said third final MAU.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The arbiter according to the present invention initially sends a priority change signal (change_id) indicating a time that each MAU can have a chance to convert its priority value to a top priority value before sending an acknowledgement signal to the MAUs for accessing to the memory of the system. If a MAU that is unable to access to the memory even after a given local standby period is elapsed, the MAU may obtain an access right by converting its priority value to a top priority value when it receives the priority change signal (change_id).

In addition, the arbiter initially sets a predetermined starvation period for each MAU, and it gives an access right to a MAU that does not get any access right for a given number of times equal to its critical starvation period previously predetermined.

Figure 1:
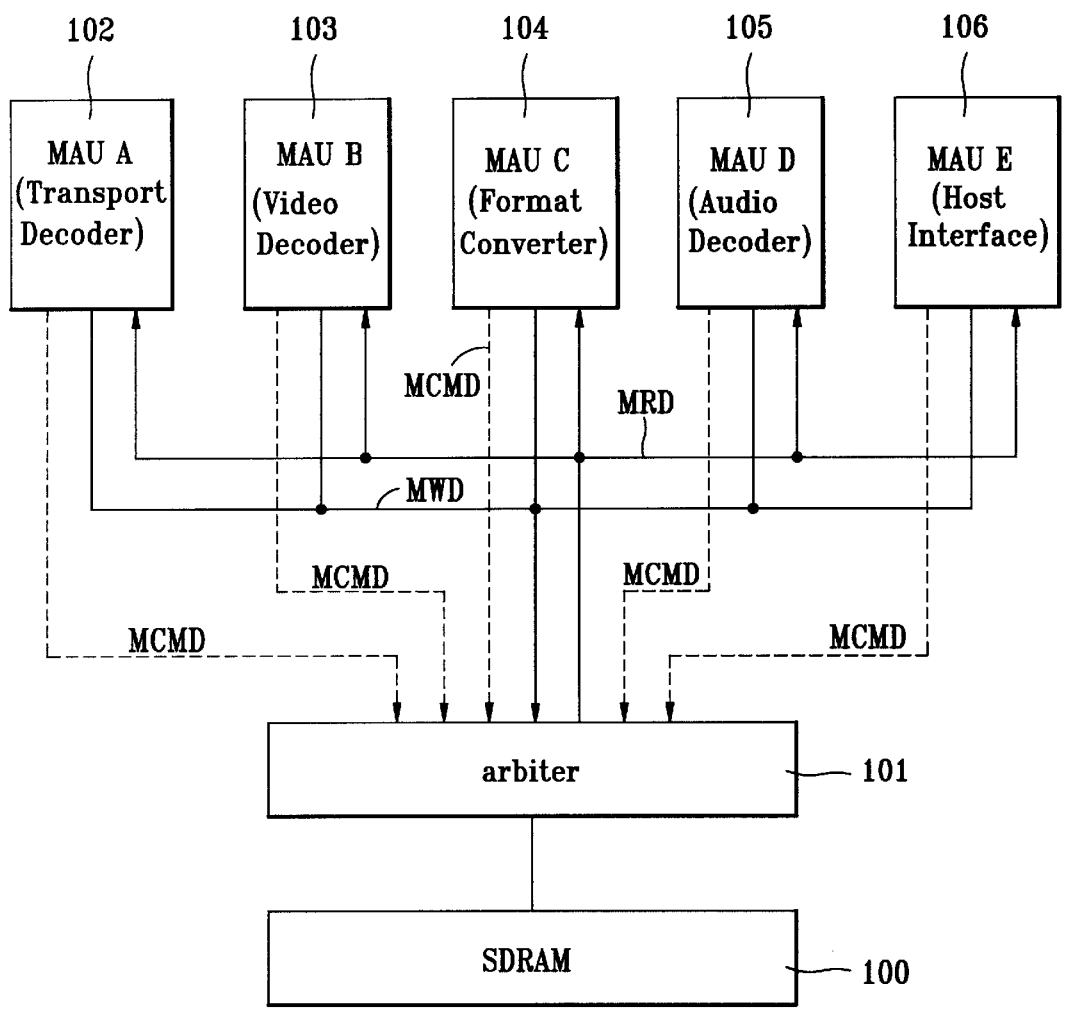
FIG. 1 illustrates a typical digital video processor showing the interfaces between an arbiter and each MAU.
Figure 2A:
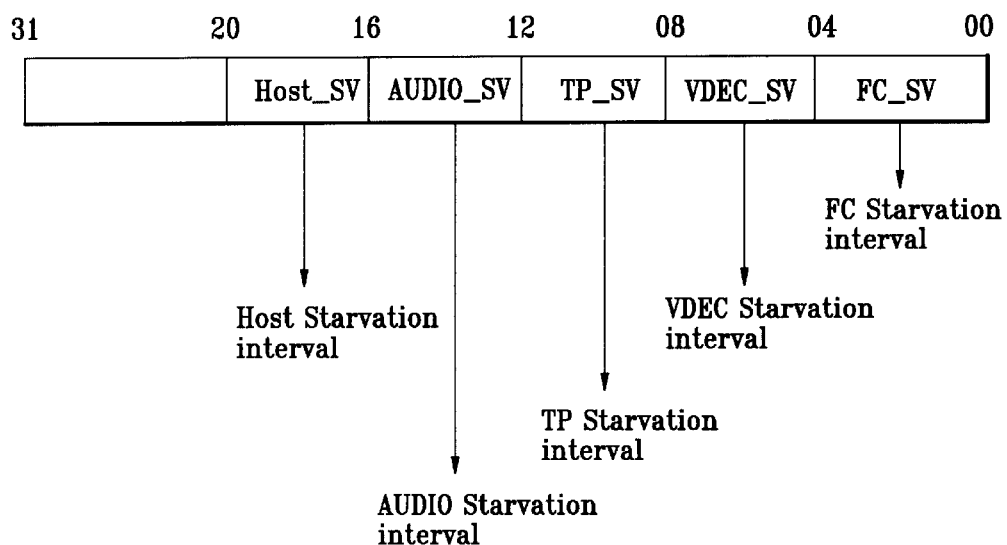
FIG. 2A illustrates a starvation value register.
Figure 2B:
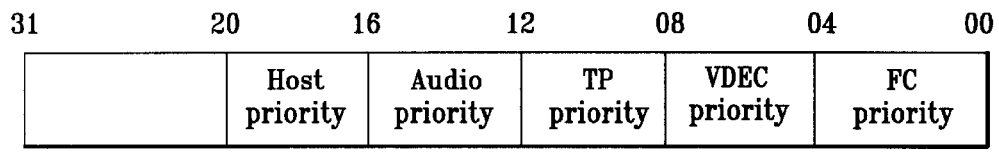
FIG. 2B illustrates a priority value register.

In order to achieve those mentioned above, the arbiter according to the present invention includes a critical starvation constant register and a priority value register, which are illustrated in FIGS. 2A and 2B, respectively. The arbiter can set a critical starvation interval and a priority value using those registers. The priority value set by the arbiter is sent to the each MAU, and each MAU uses the value as its initial priority value (req_id_xx). The priority value of each MAU represents a priority for accessing to the memory. For example, the register shown in FIG. 2A sets the starvation constant as "b1111" to disable the starvation capability. This means that if a MAU has a priority value set to "b1111", the arbiter gives the MAU a top priority access right.

Figure 3:
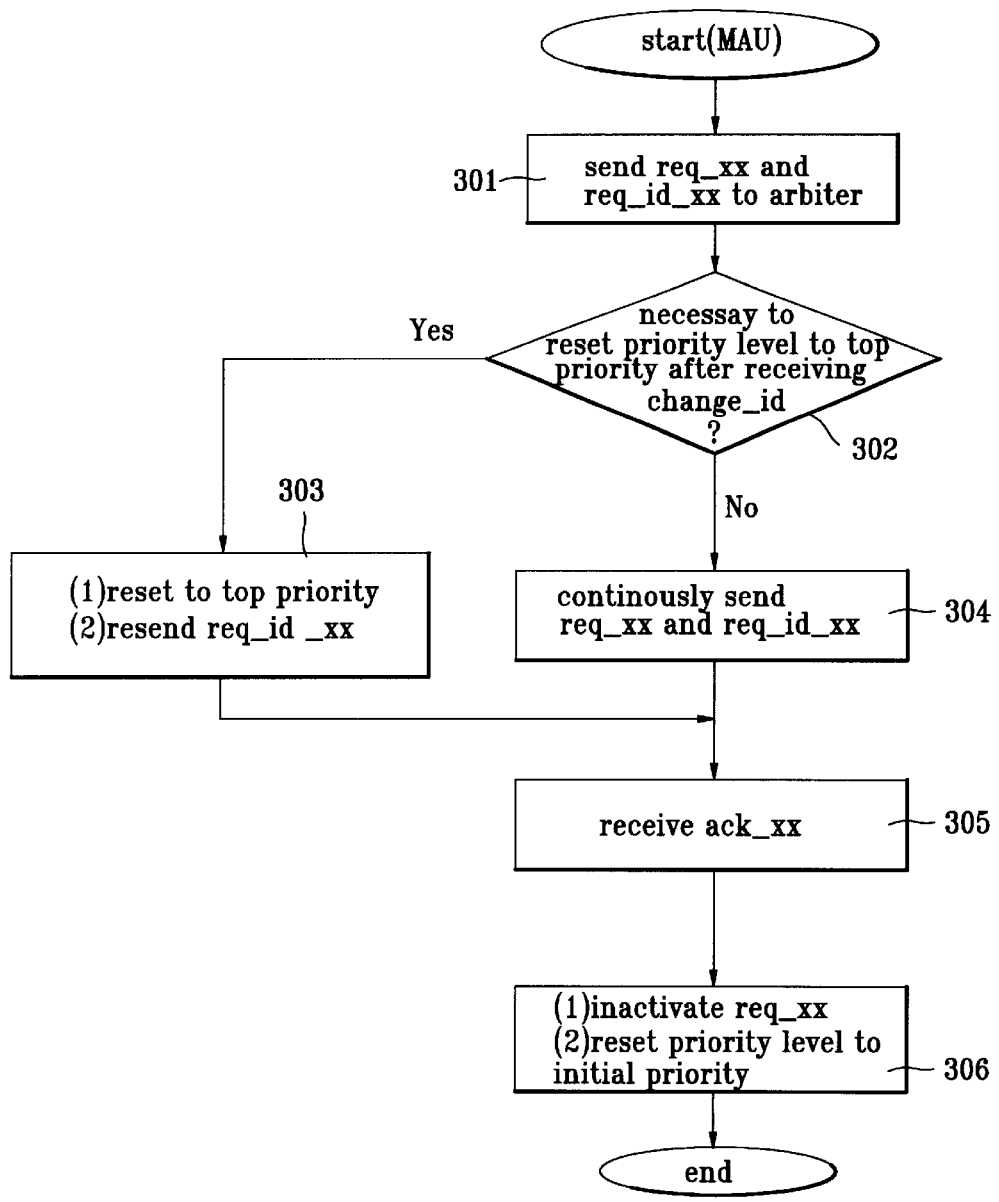
FIG. 3 is a flow chart illustrating method of accessing to a memory for a memory access unit in a data processing system according to the present invention.

The FIG. 3 is a flow chart illustrating steps that MAUs access to a memory in a data processing system according to the present invention. First, each of the MAUs (i.e., a transport decoder, video decoder, format converter, audio decoder, and host interface activates) activates its access-requesting signal (req_xx) and sends its priority signal (req_id_xx), which is set to an initial priority value, to an arbiter (S301). The initial priority value is previously determined by the arbiter.

Before the arbiter 101 sends an acknowledgement signal (ack_xx) to a MAU based on the priority values of the MAUs, it sends a priority change signal (change_id) to each MAU. The priority change signal is a signal that indicates a time that each MAU can have an opportunity to convert its priority value to a top priority. Therefore, when a MAU receives the change_id signal, the MAU checks whether it is necessary to convert its priority value (req_id_xx) to a top priority value (S302). As an example, if a MAU does not obtain an access right even after a given local standby time is elapsed, it can convert its priority value to a top priority value. The local standby time is a period of time that the MAU is supposed to be accessed to the memory.

If the MAU decides to convert the priority value to a top priority value in the step S302, it sets req_id_xx to the top priority value and sends it to the arbiter 101 (S303) while still activating req_xx. Namely, the MAU sets the value of its req_id_xx to "b 1111". The MAU inactivates req_xx (S306) after it receives an acknowledgement signal (ack_xx) (S306) from the arbiter 101.

If the MAU decides to convert the priority value to a top priority value in the step S302, it sets req_id_xx to the top priority value and send it to the arbiter 101 (S303) while still activating req_xx. Namely, the MAU sets the value of its req_id_xx to "b1111". The MAU inactivates req_xx after it receives an acknowledgement signal (ack_xx) from the arbiter 101.

On the other hand, if the MAU decides not to covert the priority value in the step S302, the MAU continuously sends req_xx and req_id_xx to the arbiter 101 (S304).

After the step S303 or S304 is performed, the MAU receives ack_xx from the arbiter 101 (S305). Subsequently, the MAU inactivates req_xx and renews req_id_xx (S306). That is, the MAU resets req_id_xx to the initial priority value set earlier after it receives ack_xx from the arbiter. MAU resets req_id_xx to the initial priority value set earlier after it receives ack_xx from the arbiter.

Figure 4:
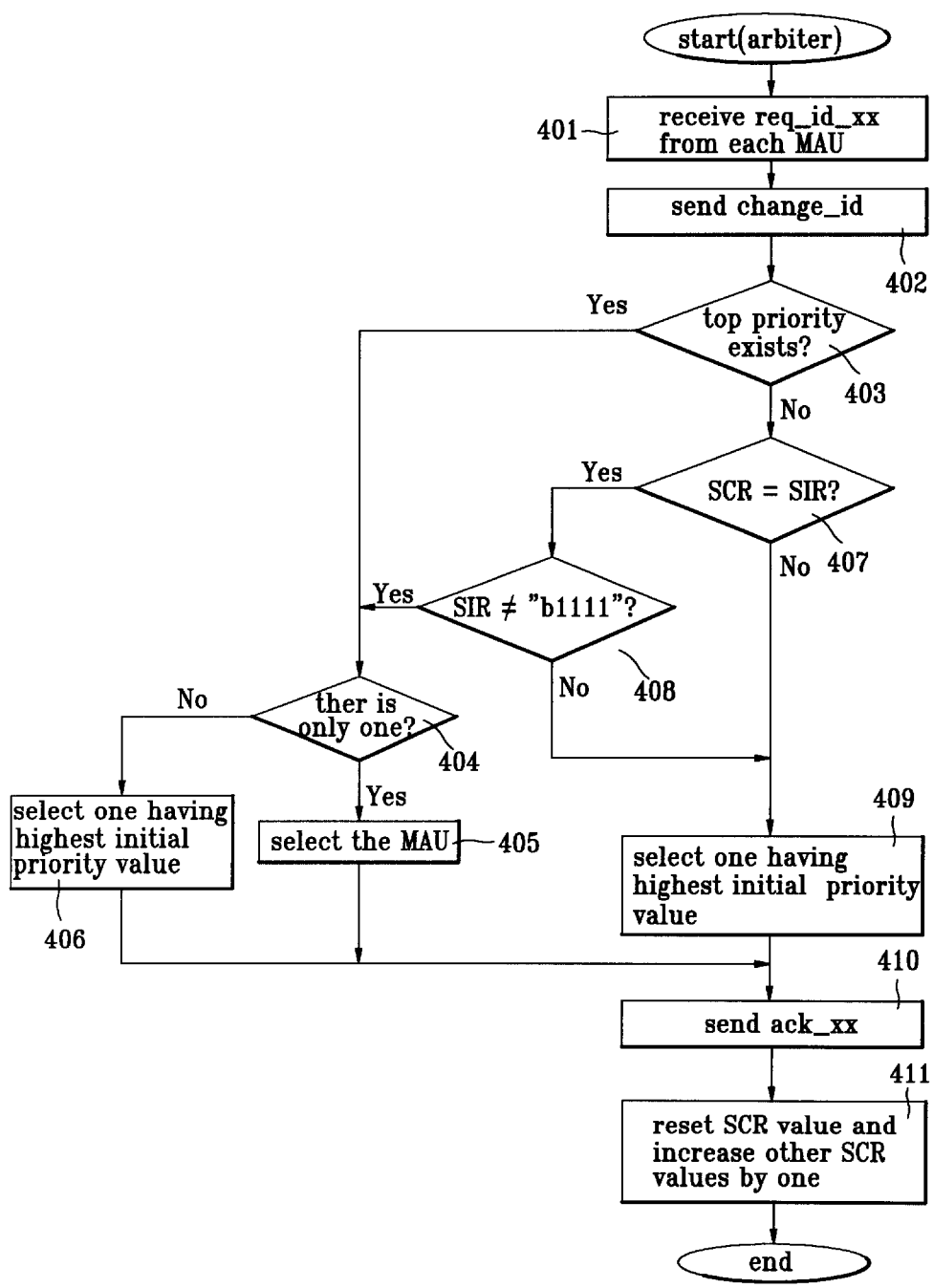
FIG. 4 is a flow chart illustrating a method of arbitrating access to a memory for an arbiter in a data processing system according to the present invention.

FIG. 4 is a flow chart illustrating a method of arbitrating MAUs' accesses to a memory in a data processing system according to the present invention. First, the arbiter 101 compares the initial priority values (req_id_xx) of the MAUs (S401) and transmits a priority change signal (change_id) indicating a time that each MAU can convert its priority value to a top priority value (S402). Then it checks whether there is any top priority value (i.e., "b1111") (S403). The priority value (req_id_xx) of a MAU represents a value set in its corresponding priority value register shown in FIG. 2B.

If there is any MAU having a top priority, it further checks the number of MAUs having a top priority (S404). If it is determined from the step S404 that there is only one MAU having a top priority, the arbiter simply selects the MAU (S405). On the other hand, it is determined that there are two or more, the arbiter selects a MAU having the highest initial priority value (S406). After the arbiter selects a MAU in the step S405 or S406, it transmits ack_xx to the selected MAU (S410).

In addition, if it is determined from the step S403 that there is no MAU having a top priority, the arbiter further checks whether there is any MAU whose Starvation Count Register (SCR) and Starvation Interval Register (SIR) values are equal. If such MAU exists, it means that the MAU did not have any access to the memory during the starvation interval period, and the arbiter gives a top priority to the MAU.

Namely, if the arbiter determines in the step S407 that there is any MAU whose SCR and SIR values are same, the arbiter checks whether the SIR value of the MAU is not "b1111" (S408). It is stated earlier that if the SIR value of the MAU is "b1111", the MAU disables the starvation capability. Therefore, a top priority will not be given to such MAU whose SIR value is "b1111" even if its SCR and SIR values are same.

Therefore, if it is determined that there is at least one MAU whose SCR and SIR values are same, and its SIR value is different from "b1111", then the arbiter will check the number of such MAUs (S404). If there is only one, the arbiter will select the MAU regardless of its priority value (S405). On the other hand, if there are more than one, the arbiter will select the MAU having the highest initial priority value (S406). Thereafter, it will send ack_xx to the selected MAU (S410).

If it is determined by the step S407 that there is no MAU whose SCR and SIR values are same, then the arbiter will select a MAU having the highest initial priority value (S409). Then it sends ack_xx to the selected MAU (S410).

After an acknowledge signal is sent to the MAU selected in the step S405, S406, or S409, the arbiter sets the SCR value of the selected MAU to "0" and increase the SCR values of all other non-selected MAUs by one (S411).

Figure 5:
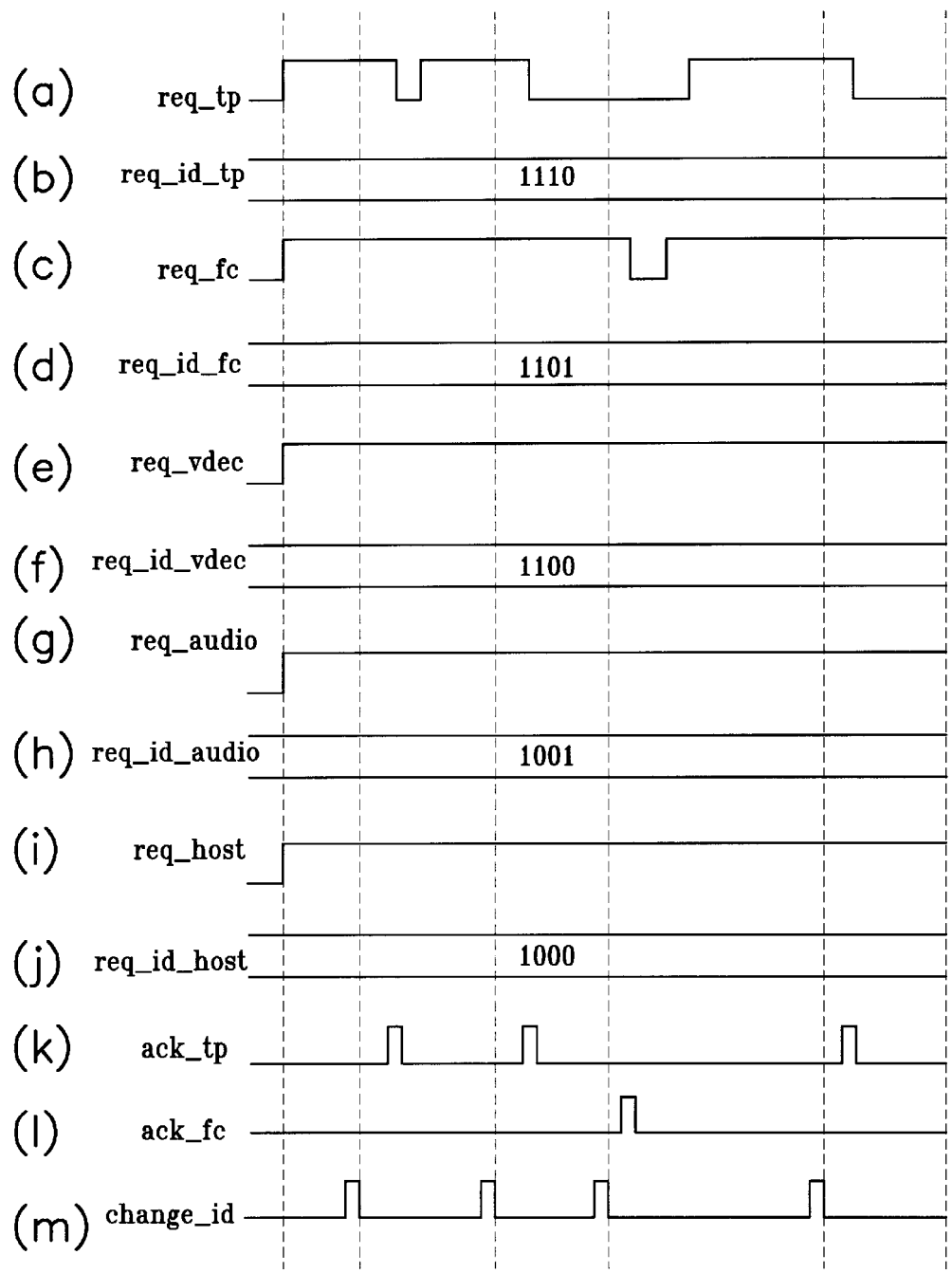
FIG. 5 illustrates an example signal of each element of the digital video processor having no top priority MAU.

FIG. 5 illustrates a signal of each element of the digital video processor including an arbiter, where no MAU changes its priority to a top priority, and every MAU has an unlimited starvation interval value ("b1111"). For example, an accessing requesting signal that the transport decoder 102 sends is set to req_tp shown in FIG. 5, and the priority value (req_id_tp) is set to "1110".

According to FIG. 5, no MAU converts its req_id_xx to a top priority based on change_id received from the arbiter. In addition, the starvation interval values of all MAU are initially set to "b1111". Therefore, the starvation capability is not used.

The transport decoder 102 and the format converter 104 that activated the requesting signals as shown in FIGS. 5 (a) and (c) get accesses to the memory in an order based on their priority values after receiving the acknowledgement signals shown in FIGS. 5 (k) and (l), on the other hand, the audio decoder 105, video decoder 103, and host interface 106 are not able to access to the memory.

The signal change_id shown in FIG. 5 (m) is a signal that indicates a time that each MAU may change its priority value to a top priority value, and it is sent to each MAU by the arbiter before the arbiter completes its data read or write transmission. In other words, the arbiter sends change_id to each MAU before it sends ack_xx to a MAU. In addition, the time for sending change_id depends on the read/write cycle, the number of words requested, the format of the bank, and many others.

Figure 6:
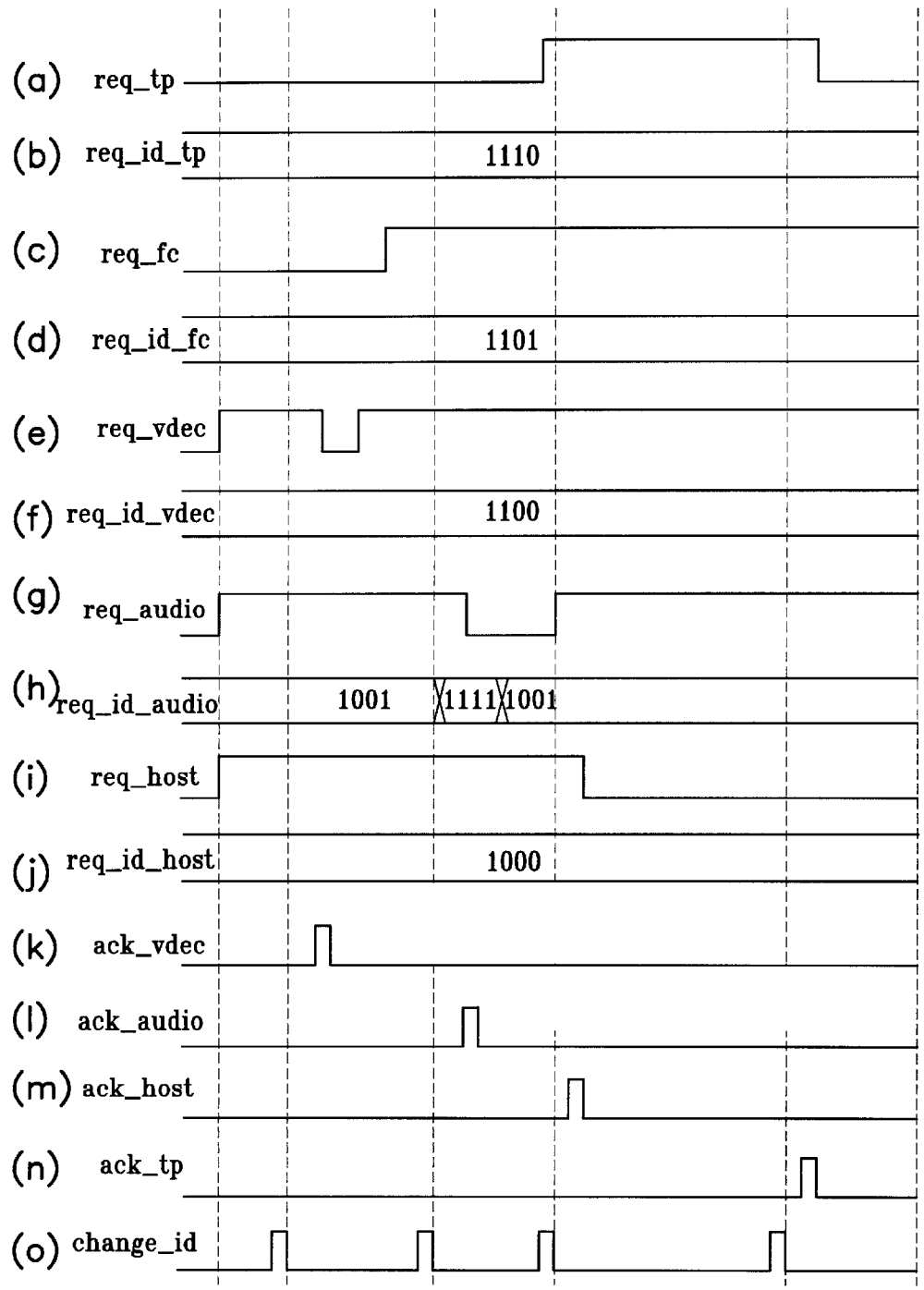
FIG. 6 illustrates an example signal of each element of the digital video processor having at least one top priority MAU.

FIG. 6 illustrate a signal of each element of the digital video processor including an arbiter, where there is any least one MAU that changes its priority to a top priority and at least one MAU whose starvation interval value is not set to "b1111". When the audio decoder 105 receives change_id from the arbiter 101, it sets its req_id_audio to a top priority value (i.e., 1111). In other words, when it receives change_id, it determines that it must obtain the access right and change its priority value to a top priority value. As a result, it receives the ack_audio shown in FIG. 6 (l) from the arbiter.

In a case where the starvation interval value of the host interface 106 is set to "b0010", the arbiter gives an access right to the host interface 106 regardless of its initial priority value if it determines that the host interface 106 fails to access to the memory twice.

The advanced priority algorithm shown above is used for the method and system for arbitrating accesses to a memory in accordance with the present invention. As a result, the memory data bus is more efficiently used by the MAUs.

The arbiter gives each MAU a chance to change its priority value to a top priority value. Therefore, the memory data bus is used more efficient than the existing priority-based method of arbitrating access to a memory.

In addition, after the arbiter sets a starvation interval value N for each MAU, it gives an access right to a MAU that fails to obtain an access right for N times.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A memory accessing method for a plurality of memory access units (MAUs) in a data processing system having a memory, the method comprising the steps of:
   (a) sending an access requesting signal and a first priority signal from each of the MAUs to an arbiter, said first priority signal of each of the MAUs indicating a priority level initially set to an initial priority value;
   (b) resetting said priority level of one of the MAUs to a top priority value and sending a second priority signal indicating said reset priority level to said arbiter;
   (c) receiving an acknowledgement signal from said arbiter thereby allowing the one of the MAUs to access said memory;
   (d) continuously sending said access requesting signal and said first priority signal from the ones among the plurality of MAUs that have not been acknowledged based upon starvation values stored in a starvation interval until said acknowledgement signal is sent from said arbiter to the ones among the plurality of MAUs that have not been acknowledged; and
   (e) giving access to the memory to the one among the plurality of MAUs that have not been acknowledged which has the highest initial priority value.

2. The method of claim 1, wherein in the step (b), said initially set priority level is reset to said top priority if said acknowledgement is not received for a predetermined period of time.

3. The method of claim 1 further comprising a step of resetting said reset priority level to said initial priority value.

4. The method of claim 1, wherein the resetting step (b) is performed after receiving said permission signal from said arbiter, said permission signal allowing said one of the MAUs to reset its priority level if necessary.

5. A memory accessing method for a plurality of memory access units (MAUs) in a data processing system having a memory, the method comprising the steps of:
   (a) sending an access requesting signal from each of the MAUs and a first priority signal to an arbiter, said first priority signal of each of the MAUs indicating a priority level initially set to an initial priority value;
   (b) determining whether to reset said priority level of one of the MAUs to a top priority value;
   (c) resetting said priority level to said top priority value of the one of the MAUs and sending a second priority signal indicating said reset priority level to said arbiter if it is determined to reset said initially set priority level in the step (b); and
   (d) receiving an acknowledgement signal from said arbiter thereby allowing the one of the MAUs which has had its priority level reset to said highest priority to access said memory,
   wherein each of the MAUs has a predetermined starvation interval, and if any of the MAUs is left unacknowledged for a period longer than its starvation interval, the one among the any of the MAUs left unacknowledged that has the highest initial priority value is given a right to access the memory.

6. The method of claim 5 further comprising a step of resetting said reset priority level to said initial priority value.

7. The method of claim 5, wherein the determination step (b) is performed after receiving said permission signal from said arbiter, said permission signal allowing said one of the MAUs to reset its priority level if necessary.

8. The method of claim 5, wherein in step (c), said one of the MAUs determines to reset its priority level to said top priority if said acknowledgment signal is not received for a predetermined period of time.

9. The method of claim 5 further comprising a step of continuously sending said access requesting signal and said first priority signal until said acknowledgement signal is received from said arbiter.

10. A method of arbitrating access to a memory for an arbiter in a data processing system having memory access units (MAU), the method comprising the steps of:
    (a) receiving an access requesting signal and a first priority signal from each of an original set of MAUs, said first priority signal indicating a priority level initially set to an initial priority value for each MAU;
    (b) identifying a first set of top priority MAUs whose priority levels are set to a top priority value;
    (c) selecting a first final MAU among said first set of top priority MAUs; and
    (d) sending an acknowledgement signal to said first final MAU,
    wherein each of the MAUs has a predetermined starvation interval, and if at least one of the MAUs is left unacknowledged for a period longer than its starvation interval, the one among the at least one of the MAUs left unacknowledged that has the highest initial priority value is given a right to access the memory.

11. The method of claim 10, wherein said first set of top priority MAUs are identified by receiving a second priority signal from each of said first set of top priority MAUs, said second priority signal indicating said reset priority level.

12. The method of claim 11 further comprising a step of sending a permission signal to each of said original set of MAUs to give each of said original set of MAUs a chance to reset its priority level to said top priority value if necessary.

13. The method of claim 10, wherein said first final MAU has its priority level set to the highest initial priority value among said first set of top priority MAUs.

14. The method of claim 10 further comprising the steps of:
    (e) identifying a second set of top priority MAUs if none of said first set of top priority MAUs are identified in the step (b), each of said second set of top priority MAUs being unable to access to said memory for a predetermined starvation period;
    (f) selecting a second final MAU among said second set of top priority MAUs; and
    (g) sending said acknowledgement signal to said second final MAU.

15. The method of claim 14, wherein said second final MAU has its priority level set to the highest initial priority value among said second set of top priority MAUs.

16. The method of claim 14 further comprising the steps of:

(h) selecting a third final MAU among said original set of MAUs if none of said second set of top priority MAUs are identified in the step (e); and (i) sending said acknowledgement signal to said third final MAU.

17. The method of claim 16, wherein said third final MAU has its priority level set to the highest initial priority value among said original set of MAUs.

18. A system for accessing to a memory in a data processing system, the system comprising:

a plurality of memory access units (MAU), each MAU initially sending an access requesting signal and a first priority signal that indicates a priority level set to an initial priority value, each MAU resetting said initially set priority level to a top priority value if necessary and sending a second priority signal indicating said reset priority level; and an arbiter identifying a first set of top priority MAUs whose priority levels are reset to said top priority value, said arbiter subsequently selecting a first final MAU among said first set of top priority MAUs and sending an acknowledgement signal to said first final MAU, wherein each of the MAUs has a predetermined starvation interval stored in a starvation interval register, and if at least one of the MAUs is left unacknowledged for a period longer than its starvation interval, the one among the at least one of the MAUs left unacknowledged that has the highest initial priority value is given an access right the memory.

19. The system of claim 18, wherein each of said plurality of MAUs optionally resets said initially set priority level to said top priority value if said acknowledgement signal is not received from said arbiter for a predetermined period of time.

20. The system of claim 18, wherein all of said first set of top priority MAUs reset their priority levels to said initial priority value after said acknowledgement signal is sent to said first final MAU.

21. The system of claim 18, wherein each of said plurality of MAUs receives a permission signal from said arbiter, said permission signal allowing each of said plurality of MAUs to reset its priority level if necessary.

22. The system of claim 18, wherein each of said plurality of MAUs continuously sends said access requesting signal and said first priority signal until said acknowledgement signal is received from said arbiter.

23. The system of claim 18, wherein said arbiter identifies said first set of top priority MAUs by receiving a second priority signal from each of said first set of top priority MAUs, said second priority signal indicating said reset priority level.

24. The system of claim 18, wherein said first final MAUs has its priority level set to the highest initial priority value among said first set of top priority MAUs.

25. The system of claim 18, wherein said arbiter further identifies a second set of top priority MAUs being unable to access to said memory for a predetermined starvation period if none of said first set of top priority MAUs are identified, said arbiter selecting a second final MAU among said second set of top priority MAUs and sending said acknowledgement signal to said second final MAU.

26. The system of claim 25, wherein said second final MAU has its priority level set to the highest initial priority value among said second set of top priority MAUs.

27. The system of claim 25, wherein said arbiter further selects a third final MAU among said plurality of MAUs if non of said second set of top priority MAUs are identified and sends said acknowledgement signal to said third final MAU.

28. The system of claim 27, wherein said third final MAU has its priority level set to the highest initial priority value among said plurality of MAUs.

* * * * *